(12) United States Patent
Suda (10) Patent No.: US 9,393,514 B2
(45) Date of Patent: Jul. 19, 2016

(54) TAR REMOVAL DEVICE

(75) Inventor: Toshiyuki Suda, Tokyo (JP)

(73) Assignee: IHI CORPORATION (JP)

( * ) Notice: Subject to any disclaimer, the term of this patent is extended or adjusted under 35 U.S.C. 154(b) by 373 days.

(21) Appl. No.: 14/007,433

(22) PCT Filed: Mar. 28, 2012

(86) PCT No.: PCT/JP2012/058079
§ 371 (c)(1),
(2), (4) Date: Sep. 25, 2013

(87) PCT Pub. No.: WO2012/133498
PCT Pub. Date: Oct. 4, 2012

(65) Prior Publication Data
US 2014/0017140 A1    Jan. 16, 2014

(30) Foreign Application Priority Data

Mar. 28, 2011  (JP) .................................. 2011-069742

(51) Int. Cl.
*C10J 3/58* (2006.01)
*B01D 49/00* (2006.01)
*C10K 1/26* (2006.01)
(Continued)

(52) U.S. Cl.
CPC ................ *B01D 49/00* (2013.01); *C10J 3/482* (2013.01); *C10J 3/56* (2013.01); *C10K 1/26* (2013.01); *C10K 1/30* (2013.01); *C10K 3/003* (2013.01); *F23C 10/002* (2013.01); *F23C 10/10* (2013.01); *C10J 2300/093* (2013.01); *C10J 2300/0976* (2013.01); *C10J 2300/0993* (2013.01); *C10J 2300/1637* (2013.01); *C10J 2300/1807* (2013.01); *C10J 2300/1853* (2013.01)

(58) Field of Classification Search
CPC combination set(s) only.
See application file for complete search history.

(56) References Cited

U.S. PATENT DOCUMENTS 4,233,275 A    11/1980    Kimura et al. ................ 423/230

FOREIGN PATENT DOCUMENTS

| CN | 201517093 U | 6/2010 |
|---|---|---|
| JP | 57-092084 | 6/1982 |

(Continued)

OTHER PUBLICATIONS

International Search Report and Written Opinion mailed May 15, 2012 in corresponding PCT International Application No. PCT/JP2012/058079.

(Continued)

*Primary Examiner* — Kaity Handal
(74) *Attorney, Agent, or Firm* — Ostrolenk Faber LLP (57) ABSTRACT

A tar removal device removes tar contained in a gasification gas (9) generated in a gasification furnace of a two-towered gasifier having a combustion furnace (43) heating a heating medium (A) and the gasification furnace (47) introducing the heating medium (A) heated in the combustion furnace to perform gasification of a starting material (48). The tar removal device includes a tar separation unit (2) that introduces the gasification gas from the gasification furnace to fluidize the circulating particles (B) so as to adhere the tar in the gasification gas to the circulating particles, and a tar combustion unit (3) that introduces the circulating particles to which the tar is adhered at the tar separation unit, fluidizes the circulating particles using air (15) so as to burn the tar adhered to the circulating particles, supplies the combustion gas (16) in which the tar is burnt to the combustion furnace as a gas for combustion, and returns the circulating particles from which the tar is burnt and removed to the combustion furnace.

5 Claims, 7 Drawing Sheets

(51) Int. Cl.
    *C10K 1/30*     (2006.01)
    *C10K 3/00*     (2006.01)
    *C10J 3/56*     (2006.01)
    *C10J 3/48*     (2006.01)
    *F23C 10/00*     (2006.01)
    *F23C 10/10*     (2006.01)

(56) References Cited

FOREIGN PATENT DOCUMENTS

| JP | 61-059359 | | 12/1986 |
|----|-----------|---|---------|
| JP | 2003-238973 | | 8/2003 |
| JP | 2003-251168 | * | 9/2003 |
| JP | 2005-154722 | | 6/2005 |
| JP | 2008-260801 | | 10/2008 |
| JP | 2010-047719 | | 3/2010 |
| JP | 2010-215888 | | 9/2010 |
| JP | 2011-026489 | | 2/2011 |
| JP | 2011-037933 | | 2/2011 |

OTHER PUBLICATIONS

Office Action dated Dec. 16, 2014 and Search Report in corresponding Chinese Patent Application No. 201280015479.5 (with English language translation)(13 pages).

Zhang Zhaojie et al., "Boiler Safety Manager Training Course," Jan. 2007, pp. 24-25 (with partial English language translation)(8 pages).

Chinese Office Action, dated May 6, 2014, issued in corresponding Chinese Patent Application No. 201280015479.5, filed Mar. 28, 2012, including English translation of Search Report. Total 9 pages.

* cited by examiner

TAR REMOVAL DEVICE

TECHNICAL FIELD

The present invention relates to a tar removal device for removing a tar contained in a gasification gas generated in a gasification furnace.

Priority is claimed on Japanese Patent Application No. 2011-69742, filed on Mar. 28, 2011, the content of which is incorporated herein by reference.

BACKGROUND ART

Gasification systems are known in which solid fuels such as coal, organic wastes such as residues generated when petroleum is refined, waste plastics, sludge, municipal refuse, or biomass fuel are used as gasification starting materials. In the gasification systems, the starting materials are supplied to and gasified in a gasification furnace, such as a steam gasification furnace, a pyrolytic gasification furnace, or a partial oxidation gasification furnace, thereby generating gasification gas. A refined gas obtained by purifying and refining the gasification gas is supplied as either fuel for power-generating facilities, combustion furnaces, and internal combustion engines or a source gas of hydrogen production systems and ammonia production systems.

In such gasification systems, it is known that a tarry component (hereinafter collectively referred to as "tar") that is hardly decomposed during gasification is contained in the gasification gas generated by gasifying the gasification starting material in the gasification furnace. This tar adheres to piping or a thermal apparatus provided on a rear stage of the gasification furnace, thereby reducing the function of the thermal apparatus or causing blockage which stops the function of the thermal apparatus.

For this reason, a tar removal device for removing the tar in the gasification gas has been variously proposed conventionally. For example, it is set forth in Patent Document 1 that a container main body in which a ceramic layer made up of an assembly of numerous porous ceramic heat reservoirs capturing tar in a gasification gas is filled in predetermined compartments and a switching means that selectively circulates the gasification gas and a gasifying agent to the ceramic layers of the compartments are provided to capture the tar by passing the gasification gas through the ceramic layer and then passing the gasifying agent through the ceramic layer capturing the tar, thereby removing the tar and supplying the gasifying agent containing the removed tar to a gasification furnace.

PRIOR ART DOCUMENT

Patent Document

[Patent Document 1]
Japanese Unexamined Patent Application, First Publication No. 2010-047719

SUMMARY OF THE INVENTION

Problem to be Solved by the Invention

However, the tar removal device as set forth in Patent Document 1 has a complicated structure because the a ceramic layer made up of the assembly of numerous porous ceramic heat reservoirs is constituted to be filled in the predetermined compartments of the container main body. Further, since the gasification gas and the gasifying agent are switched and introduced with respect to each compartment, a structure in which a switching unit such as a damper or the container main body is rotated and switched is required. As such, the structure of the tar removal device is further complicated.

The present invention has been made keeping in mind the above problems, and an object of the present invention is to provide a tar removal device capable of effectively removing a tar contained in a gasification gas generated in a gasification furnace in a simple structure.

Means for Solving Problem

According to a first aspect of the present invention, there is provided a tar removal device that removes tar contained in a gasification gas generated in a gasification furnace of a two-towered gasifier having a combustion furnace heating a heating medium and the gasification furnace introducing the heating medium heated in the combustion furnace to perform gasification of a starting material. The tar removal device includes a tar separation unit that introduces the gasification gas from the gasification furnace to fluidize circulating particles so as to adhere the tar in the gasification gas to the circulating particles, and a tar combustion unit that introduces the circulating particles to which the tar is adhered at the tar separation unit, fluidizes the circulating particles using air so as to burn the tar adhered to the circulating particles, supplies the combustion gas in which the tar is burnt to the combustion furnace as a gas for combustion, and returns the circulating particles from which the tar is burnt and removed to the tar separation unit.

According to a second aspect of the present invention, in the tar removal device according to the first aspect, the tar separation unit and the tar combustion unit include fluidizing injection nozzles at bottoms thereof and are provided on left and right sides in a container main body; the tar separation unit and the tar combustion unit are partitioned by a vertical partition wall that extends forward and backward in the center of a facing position thereof and defines front and rear passages between the container main body and the vertical partition wall; at a side of the tar separation unit of one of the front and rear passages, a separation-side low injection zone is formed in which the gasification gas is injected at a smaller injection quantity than a set injection quantity of a separation-side fluidization zone formed by uniform injection of the gasification gas performed by the fluidizing injection nozzles; at a side of the tar separation unit of the other of the front and rear passages, a separation-side high injection zone is formed in which the gasification gas is injected at a greater injection quantity than the set injection quantity of the separation-side fluidization zone; at a side of the tar combustion unit of one of the front and rear passages, a combustion-side high injection zone is formed in which the air is injected at a greater injection quantity than a set injection quantity of a combustion-side fluidization zone formed by uniform injection of the air performed by the fluidizing injection nozzles, and at a side of the tar combustion unit of the other of the front and rear passages, a combustion-side low injection zone is formed in which the air is injected at a smaller injection quantity than the set injection quantity of the combustion-side fluidization zone.

According to a third aspect of the present invention, in the tar removal device according to the second aspect, the vertical partition wall that is located at the center between the front and the rear of the facing position and defines the front and rear passages is replaced by a horizontal partition wall that extends leftward and rightward at the facing position between the tar separation unit and the tar combustion unit and defines the front and rear passages.

According to a fourth aspect of the present invention, in the tar removal device according to the second or third aspect, the injection nozzles of the separation-side low injection zone have a channel cross-sectional area set to be small relative to the fluidizing injection nozzles provided at the separation-side fluidization zone; the injection nozzles provided at the separation-side high injection zone have a channel cross-sectional area set to be large relative to the fluidizing injection nozzles provided at the separation-side fluidization zone; the injection nozzles of the combustion-side high injection zone have a channel cross-sectional area set to be large relative to the fluidizing injection nozzles provided at the combustion-side fluidization zone; and the injection nozzles of the combustion-side low injection zone have a channel cross-sectional area set to be small relative to the fluidizing injection nozzles provided at the combustion-side fluidization zone.

According to a fifth aspect of the present invention, in the tar removal device according to the second or third aspect, the bottom of the tar separation unit includes the fluidizing injection nozzles having a uniform channel cross-sectional area; the bottom of the tar combustion unit includes the fluidizing injection nozzles having a uniform channel cross-sectional area; the tar separation unit includes a medium-pressure introduction chamber guiding the gasification gas to the separation-side fluidization zone, a low-pressure introduction chamber guiding the gasification gas to the separation-side low injection zone, a high-pressure introduction chamber guiding the gasification gas to the separation-side high injection zone and a pressure adjusting means adjusting a pressure of the gasification gas supplied to each of the medium-pressure introduction chamber, the low-pressure introduction chamber, and the high-pressure introduction chamber; and the tar combustion unit includes a medium-pressure introduction chamber guiding the air to the combustion-side fluidization zone, a high-pressure introduction chamber guiding the air to the combustion-side high injection zone, a low-pressure introduction chamber guiding the air to the combustion-side low injection zone, and a pressure adjusting means adjusting a pressure of the air supplied to each of the medium-pressure introduction chamber, the high-pressure introduction chamber, and the low-pressure introduction chamber.

According to a sixth aspect of the present invention, in the tar removal device according to the first aspect, the tar separation unit that ejects the gasification gas to fluidize the circulating particles using the fluidizing injection nozzles provided at the bottom thereof and adheres the tar in the gasification gas to the circulating particles and the tar combustion unit that ejects the air to fluidize the circulating particles using the fluidizing injection nozzles provided at the bottom thereof and burns the tar of the circulating particles are independently provided, and a separation unit that introduces a fluidized material guided out of the tar separation unit and separates the fluidized material into the circulating particles to which the tar is adhered and the gasification gas, a circulation path that supplies the circulating particles, to which the tar which is separated by the separation unit is adhered, to the tar combustion unit, a separation unit that introduces a fluidized material guided out of the tar combustion unit and separates the fluidized material into the circulating particles from which the tar is burnt and a combustion exhaust gas, and a circulation path that supplies the circulating particles, from which the tar is removed and which are separated by the separation unit, to the tar separation unit are provided.

Effects of the Invention

According to the tar removal device of the present invention, the tar contained in the gasification gas generated in the gasification furnace can be effectively removed by a simple device constitution. Further, heat of the combustion gas in which the tar is burnt can be effectively used to heat the circulating particles in the combustion furnace. As such, thermal efficiency is increased, and a gasification rate is improved.

DESCRIPTION OF EMBODIMENTS

Hereinafter, embodiments of the present invention will be described along with shown examples.

Figure 1:
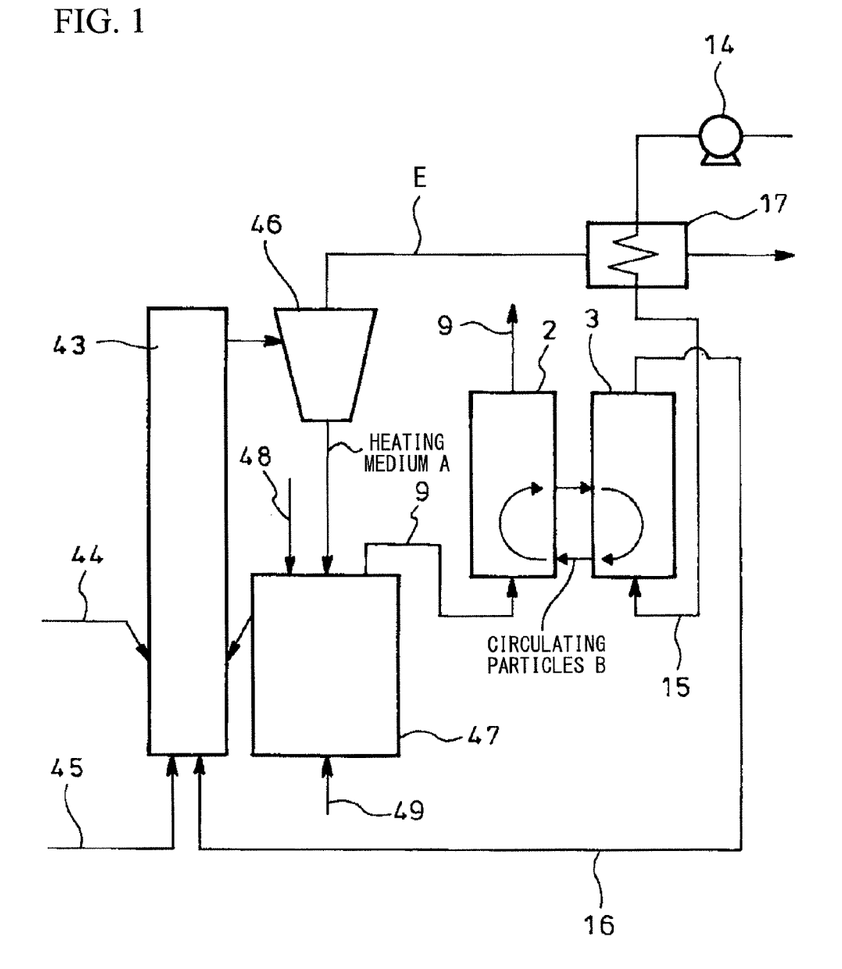
FIG. 1 is a side view showing a schematic constitution of a two-towered gasifier having a tar removal device of the present invention.

FIG. 1 shows a schematic constitution of a two-towered gasifier having a tar removal device of the present invention. A reference numeral 43 indicates a combustion furnace into which a heating medium A composed of particles such as sand is charged. Coal and other fuels 44 are supplied from a lower lateral portion of the combustion furnace 43, and fluidized combustion of the fuels 44 is performed by air 45 supplied from the bottom. Thus, the heating medium A is heated. Combustion fluid extracted from an upper portion of the combustion furnace 43 is guided to a solid-gas separation unit 46 such as a cyclone and is separated into an exhaust gas E and the heating medium A, and the heating medium A is supplied to a gasification furnace 47. A starting material 48 such as coal is supplied to the gasification furnace 47, is fluidized by a gasifying agent 49 such as steam supplied to the gasification furnace 47 from the bottom, and introduces heat of the heating medium A. Thereby, gasification (endothermic reaction) of the starting material is performed. The heating medium A whose temperature is reduced in the gasification furnace 47 by supply of the heat is returned to the combustion furnace 43 for cyclic usage.

The gasification gas 9 generated in the gasification furnace 47 is supplied to a tar separation unit 2, which constitutes the tar removal device of the present invention, from the bottom.

Circulating particles B composed of alumina and porous grains are contained in the tar separation unit 2, and the gasification gas 9 is supplied from the bottom. Thereby, the circulating particles B are fluidized. During the fluidization, tar in the gasification gas 9 comes into contact with the circulating particles B and is adhered (adsorbed) to the circulating particles B. Accordingly, the gasification gas 9 from which the tar is removed is extracted from the tar separation unit 2. A reference numeral 3 indicates a tar combustion unit constituting the tar removal device. The tar combustion unit 3 introduces the circulating particles B to which the tar is adhered in the tar separation unit 2 and burns the tar using air 15 supplied from the bottom. A reference numeral 17 indicates a heat exchanger by which the air 15 from an air fan 14 is heat-exchanged with the exhaust gas E separated by the solid-gas separation unit 46. The tar is burnt by introducing the air 15 heat-exchanged by the heat exchanger 17 into the tar combustion unit 3. The circulating particles B from which the tar is burnt by the tar combustion unit 3 are circulated to the tar separation unit 2.

Furthermore, a combustion gas 16 in which the tar is burnt by the tar combustion unit 3 is supplied to the combustion furnace 43 as a gas for combustion. Here, since the air 15 having a quantity equal to or more than that of air required to burn the tar is supplied to the tar combustion unit 3 in order to fluidize the circulating particles B, the combustion gas 16 contains sufficient oxygen. Accordingly, the combustion gas 16, which contains the oxygen in this way and is heated by the combustion of the tar, is supplied to the combustion furnace 43. Thereby, a combustion temperature of the combustion furnace 43 can be increased, and thus the supply of the fuel 44 can be reduced accordingly. In addition, as a temperature of the heating medium A is raised, a gasification rate can be increased in the gasification furnace 47. The combustion gas 16 may be independently supplied to the combustion furnace 43 or be supplied to the combustion furnace 43 along with the air 45.

Figure 2A:
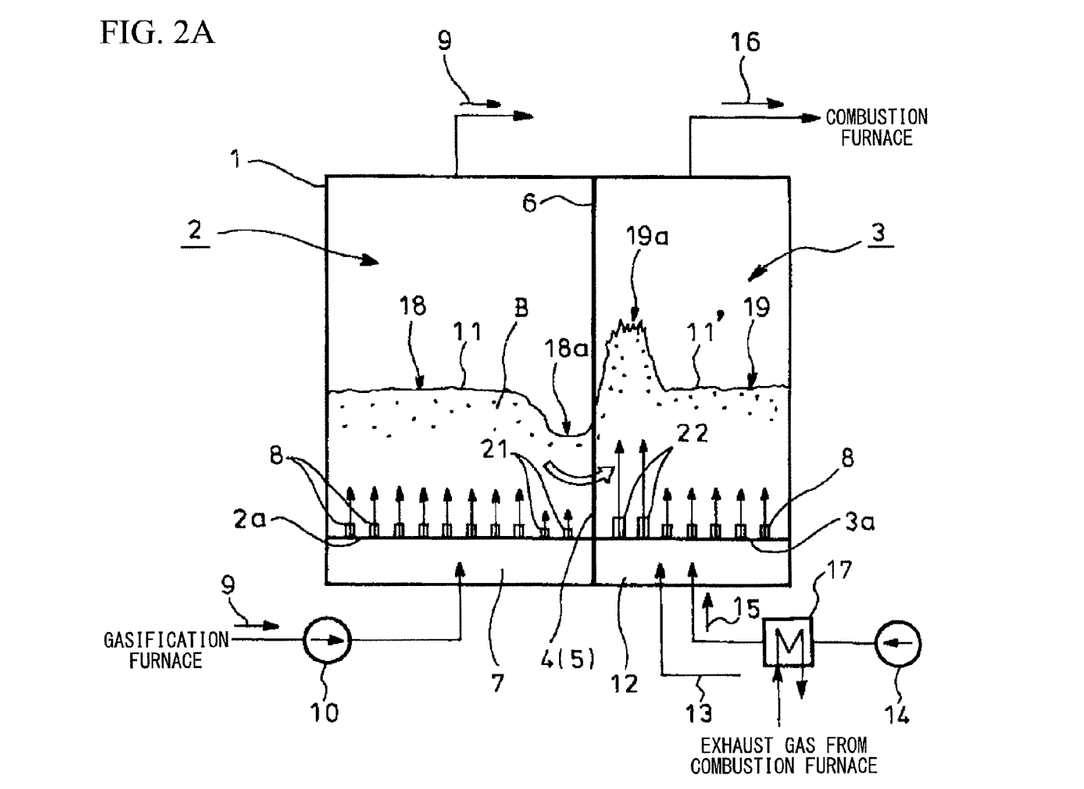
FIG. 2A is a front view showing an outline of a first embodiment of the tar removal device of the present invention.
Figure 2B:
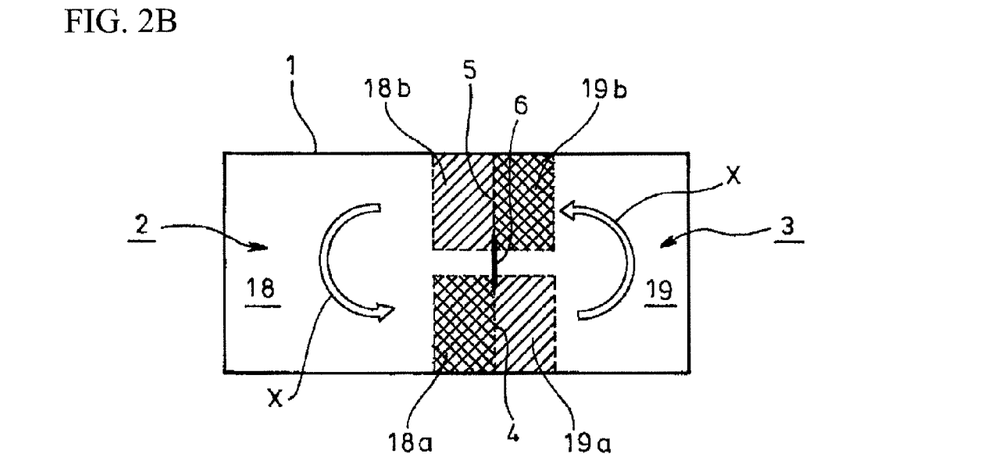
FIG. 2B is a plan view of FIG. 2A.

FIGS. 2A and 2B schematically show a first embodiment of the tar removal device. The tar removal device includes the tar separation unit 2 and the tar combustion unit 3 on left and right sides in a container main body 1. A vertical partition wall 6 is provided at a middle position (facing position) between the tar separation unit 2 and the tar combustion unit 3 facing each other, and extends forward and backward in the center between the front and the rear (top and bottom in FIG. 2B). Front and rear passages 4 and 5 are defined between the container main body 1 and the vertical partition wall 6.

The tar separation unit 2 is provided with injection nozzles 8 on a bottom 2a thereof which communicate with an introduction chamber 7 formed at a lower portion thereof. The gasification gas 9 generated in the gasification furnace is increased in pressure by a pressurization fan 10 and is introduced into the introduction chamber 7, and the gasification gas 9 is ejected from the fluidizing injection nozzles 8. Thereby, the circulating particles B composed of coexisting sand, alumina, and porous grains are fluidized to form a fluidized bed 11. When the gasification gas 9 comes into contact with the circulating particles B in the fluidized bed 11, the tar in the gasification gas 9 is removed by adherence (adsorption) of the circulating particles B. Here, the circulating particles B are heated by the gasification gas 9. The gasification gas 9 from which the tar is removed by the circulating particles B in the tar separation unit 2 is drawn from an upper portion of the tar separation unit 2. Further, in FIG. 2, the gasification gas 9 is introduced into the introduction chamber 7 via the pressurization fan 10. However, when the gasification gas 9 has a pressure required for the fluidization of the circulating particles B, the pressurization fan 10 may be omitted.

Further, the tar combustion unit 3 is provided with a plurality of fluidizing injection nozzles 8 on a bottom 3a thereof which communicate with an introduction chamber 12 formed at a lower portion thereof. The air 15 pressurized from the air fan 14 is supplied to the introduction chamber 12 and is ejected from the fluidizing injection nozzles 8. Thereby, the coexisting circulating particles B are fluidized to form a fluidized bed 11'. In the fluidized bed 11', the circulating particles B to which the tar is adhered come into contact with the air 15. Thereby, the tar is burnt, and the temperature of the circulating particles B is raised. The combustion gas 16 in which the tar is burnt in the tar combustion unit 3 is drawn from an upper portion of the tar combustion unit 3. To accelerate the combustion of the tar in the tar combustion unit 3, fuel 13 may be supplied to the tar combustion unit 3.

In the tar separation unit 2, as described above, the gasification gas 9 is uniformly injected by the fluidizing injection nozzles 8 at a set injection quantity (hereinafter, an ejecting force that is one or both of a quantity and speed of injection which are required to obtain a predetermined height of the fluidized bed 11 is referred to as an "injection quantity"), thereby forming the fluidized bed 11 to establish a separation-side fluidization zone 18 that performs the separation of the tar. Further, in the tar combustion unit 3, as described above, the air 15 is uniformly injected by the fluidizing injection nozzles 8 at a set injection quantity, thereby forming the fluidized bed 11' to establish a combustion-side fluidization zone 19 that performs the combustion of the tar. The set injection quantities based on the fluidizing injection nozzles 8 are set such that heights of the fluidized bed 11 and the fluidized bed 11' are equal to each other.

A separation-side low injection zone 18a, in which the gasification gas 9 is injected at a smaller injection quantity than the set injection quantity of the gasification gas 9 at the separation-side fluidization zone 18, is formed on the side of the tar separation unit 2 of the passage 4 that is one of the passages 4 and 5 formed back and forth. Further, a separation-side high injection zone 18b, in which the gasification gas 9 is injected at a greater injection quantity than the set injection quantity of the gasification gas 9 at the separation-side fluidization zone 18, is formed on the side of the tar separation unit 2 of the other passage 5.

Further, a combustion-side high injection zone 19a, in which the air 15 is injected at a greater injection quantity than the set injection quantity of the air 15 at the combustion-side fluidization zone 19, is formed on the side of the tar combustion unit 3 of one passage 4. Further, a combustion-side low injection zone 19b, in which the air 15 is injected at a smaller injection quantity than the set injection quantity of the air 15 at the combustion-side fluidization zone 19, is formed on the side of the tar combustion unit 3 of the other passage 5.

The tar separation unit 2 and the tar combustion unit 3 may be constituted with the same volume. However, a necessary residence time is required to effectively separate the tar from the gasification gas 9 and adhere the tar to the circulating particles B in the tar separation unit 2, whereas a relatively short time is required to be able to burn and remove the tar in the tar combustion unit 3. According to this, the volume of the tar combustion unit 3 can be reduced relative to the tar separation unit 2.

Figure 3A:
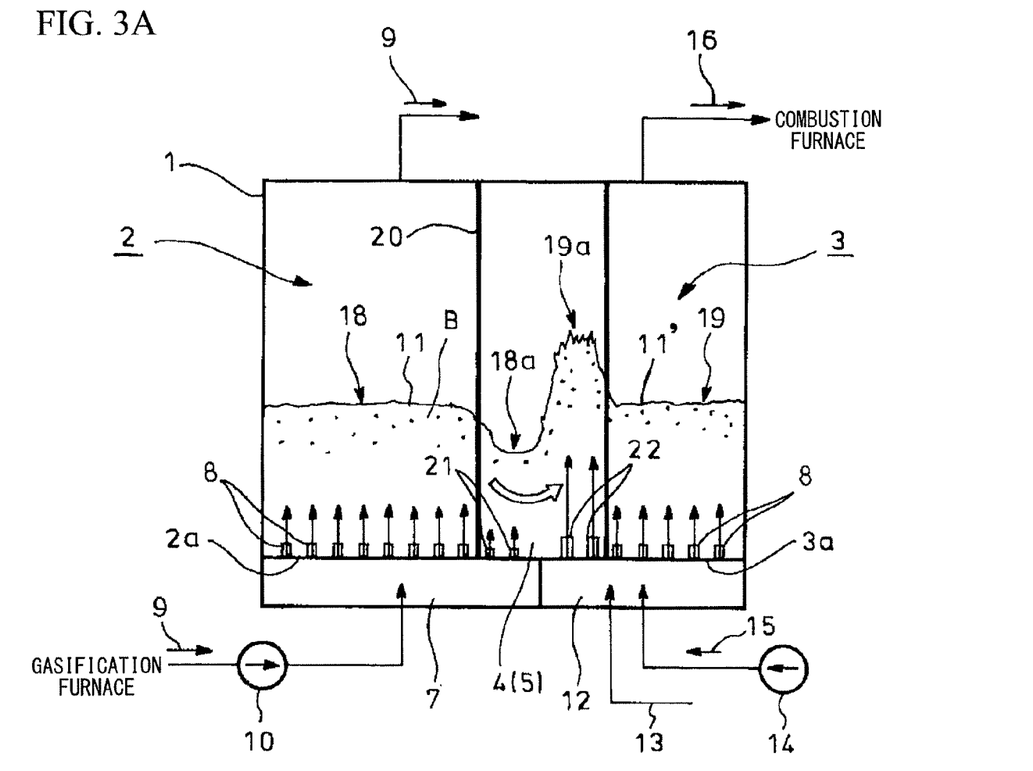
FIG. 3A is a front view showing a modification of the tar removal device shown in FIG. 2A.
Figure 3B:
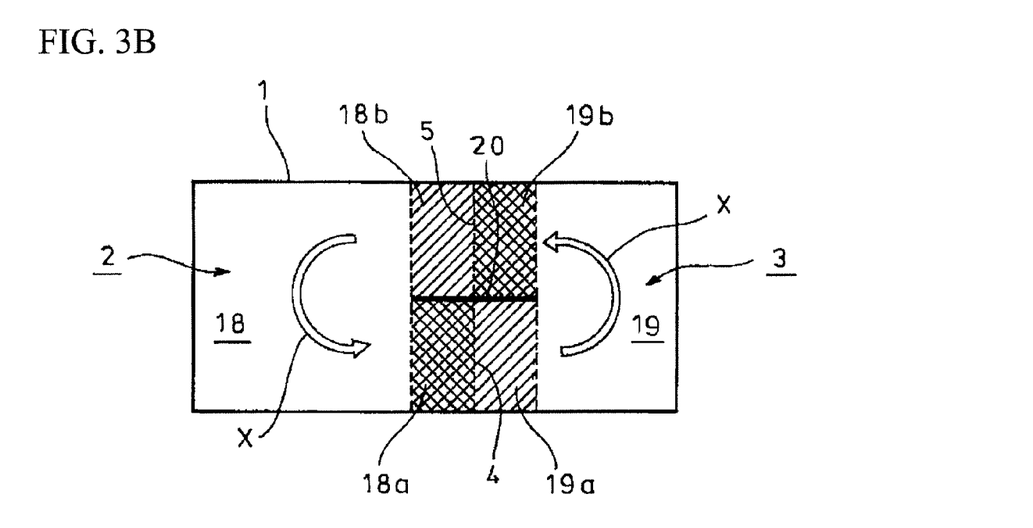
FIG. 3B is a plan view of FIG. 3A.

FIGS. 3A and 3B show a modification of the embodiment of FIGS. 2A and 2B. As such, in place of the vertical partition wall 6 that extends forward and backward in the center of the facing position and defines the front and rear passages 4 and 5 between the container main body 1 and the vertical partition wall 6 as described above, a case in which a horizontal partition wall 20 is provided so as to extend leftward and rightward in the center of the facing position between the tar separation unit 2 and the tar combustion unit 3 and to define front and rear passages 4 and 5 between the container main body 1 and the horizontal partition wall 20 is shown. The remaining constitution is similar to that of FIGS. 2A and 2B.

Figure 4A:
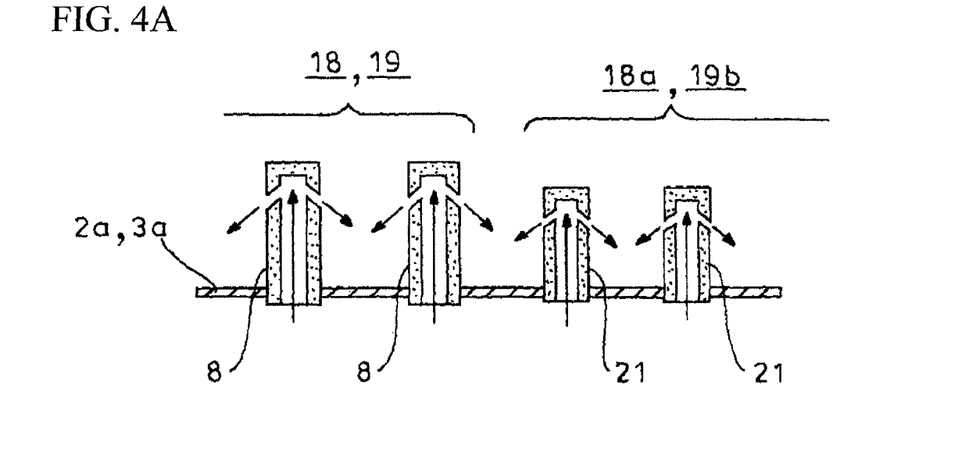
FIG. 4A is a cross-sectional view showing an example of injection nozzles provided for the tar removal device shown in FIGS. 2A and 3A.

FIG. 4A shows a specific constitution example for setting the injection quantity. As such, the separation-side low injection zone 18a and the combustion-side low injection zone 19b are provided with low injection nozzles 21 whose channel cross-sectional areas are set to be small relative to the fluidizing injection nozzles 8 provided at the separation-side fluidization zone 18 and the combustion-side fluidization zone 19. As shown in FIG. 4A, such low injection nozzles 21 may make the fluidizing injection nozzles 8 smaller.

Figure 4B:
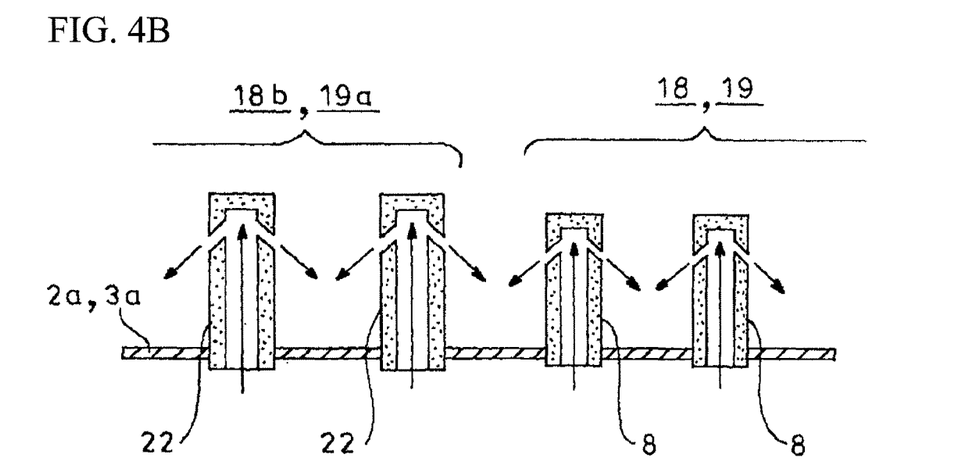
FIG. 4B is a cross-sectional view showing another example of the injection nozzles provided for the tar removal device shown in FIGS. 2A and 3A.

As shown in FIG. 4B, the separation-side high injection zone 18b and the combustion-side high injection zone 19a are provided with high injection nozzles 22 whose channel cross-sectional area is set to be large relative to the fluidizing injection nozzles 8 provided at the separation-side fluidization zone 18 and the combustion-side fluidization zone 19. As shown in FIG. 4B, such high injection nozzles 22 may make the fluidizing injection nozzles 8 larger.

Hereinafter, an operation of the embodiment will be described.

In the tar removal device shown in FIGS. 2A and 3A, the gasification gas 9 generated in the gasification furnace is increased in pressure by the pressurization fan 10, is introduced into the introduction chamber 7 of the tar separation unit 2, and is ejected from the fluidizing injection nozzles 8, thereby fluidizing the circulating particles B to form the fluidized bed 11. Further, the air 15 pressurized from the air fan 14 is supplied to the introduction chamber 12 of the tar combustion unit 3 and is ejected from the fluidizing injection nozzles 8, thereby fluidizing the circulating particles B to form the fluidized bed 11'. Here, the set injection quantities based on the fluidizing injection nozzles 8 are set to be equal such that the heights of the fluidized bed 11 and the fluidized bed 11' are equal to each other.

In the fluidized bed 11 of the tar separation unit 2, when the gasification gas 9 comes into contact with the circulating particles B, the tar in the gasification gas 9 is removed by adherence to the circulating particles B.

At the side of the tar separation unit 2 of one passage 4, since the separation-side low injection zone 18a based on the low injection nozzles 21 is formed, the circulating particles B to which the tar is adhered at the separation-side fluidization zone 18 move so as to fall toward the sides of the separation-side low injection zone 18a and the passage 4 where an ejecting force is weak. Here, at the side of the tar combustion unit 3 of one passage 4, since the combustion-side high injection zone 19a based on the high injection nozzles 22 is formed, the circulating particles B having fallen to the side of the passage 4 as described above are effectively spouted by the combustion-side high injection zone 19a and are guided to the combustion-side fluidization zone 19. Then, while circulating in the fluidized bed 11' of the combustion-side fluidization zone 19, the circulating particles B are burnt by air, become a burnt exhaust gas, and are discharged from the upper portion of the tar combustion unit 3.

Further, at the side of the tar combustion unit 3 of the other passage 5, since the combustion-side low injection zone 19b based on the low injection nozzles 21 is formed, the circulating particles B in which the combustion of the tar is performed on the combustion-side fluidization zone 19 move so as to fall toward the sides of the combustion-side low injection zone 19b and the passage 5 where the ejecting force is weak. Here, at the side of the tar separation unit 2 of the other passage 5, since the separation-side high injection zone 18b based on the high injection nozzles 22 is formed, the circulating particles B having fallen to the side of the passage 5 as described above are effectively spouted by the separation-side high injection zone 18b and are guided to the separation-side fluidization zone 18.

As described above, the circulating particles B of the separation-side fluidization zone 18 circulate in the order of the separation-side low injection zone 18a, the passage 4, the combustion-side high injection zone 19a, the combustion-side fluidization zone 19, the combustion-side low injection zone 19b, the passage 5, the separation-side high injection zone 18b, and the separation-side fluidization zone 18. Thereby, the tar in the gasification gas 9 can be continuously, effectively removed.

Figure 5:
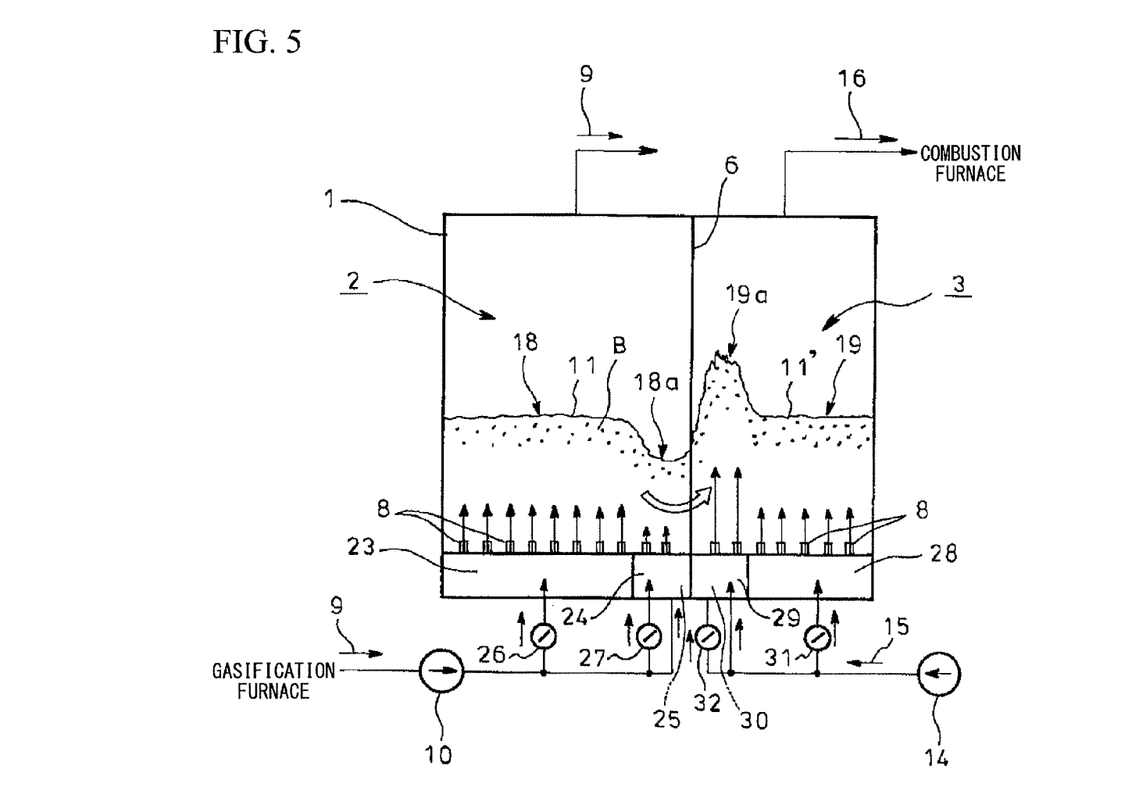
FIG. 5 is a front view showing an outline of a second embodiment of the tar removal device of the present invention.

FIG. 5 is a front view showing an outline of a second embodiment of the tar removal device of the present invention. The second embodiment is different from the first embodiment shown in FIG. 2 in that the bottom 2a of the tar separation unit 2 and the bottom 3a of the tar combustion unit 3 are equipped with fluidizing injection nozzles 8, all of which have a uniform channel cross-sectional area.

Further, the tar separation unit 2 is equipped with a medium-pressure introduction chamber 23 guiding a gasification gas 9 to a separation-side fluidization zone 18, a low-pressure introduction chamber 24 guiding the gasification gas 9 to a separation-side low injection zone 18a, and a high-pressure introduction chamber 25 guiding the gasification gas 9 to a separation-side high injection zone 18b (see FIG. 2B). The tar separation unit 2 is equipped with a pressure adjusting means for adjusting a pressure of the gasification gas 9 supplied to each of the medium-pressure introduction chamber 23, the low-pressure introduction chamber 24, and the high-pressure introduction chamber 25. In the embodiment of FIG. 5, the gasification gas 9 of high pressure is guided from a pressurization fan 10 to the high-pressure introduction chamber 25 without change, and the gasification gas 9 of medium pressure whose pressure is adjusted by a first damper (pressure adjusting means) 26 is guided to the medium-pressure introduction chamber 23. Further, the gasification gas 9 of low pressure whose pressure is adjusted so as to be lower than that of the medium-pressure introduction chamber 23 by a second damper (pressure adjusting means) 27 is guided to the low-pressure introduction chamber 24.

Further, the tar combustion unit 3 is equipped with a medium-pressure introduction chamber 28 guiding air 15 to a combustion-side fluidization zone 19, a high-pressure introduction chamber 29 guiding the air 15 to a combustion-side high injection zone 19a, and a low-pressure introduction chamber 30 guiding the air 15 to a combustion-side low injection zone 19b (see FIG. 2B). The tar combustion unit 3 is equipped with a pressure adjusting means for adjusting a pressure of the air 15 supplied to each of the medium-pressure introduction chamber 28, the high-pressure introduction chamber 29, and the low-pressure introduction chamber 30. In the embodiment of FIG. 5, the air 15 of high pressure is guided from an air fan 14 to the high-pressure introduction chamber 29 without change, and the air 15 of medium pressure whose pressure is adjusted by a first damper (pressure adjusting means) 31 is guided to the medium-pressure introduction chamber 28. Further, the air 15 of low pressure whose pressure is adjusted so as to be lower than that of the medium-pressure introduction chamber 28 by a second damper (pressure adjusting means) 32 is guided to the low-pressure introduction chamber 30.

In the embodiment of FIG. 5, the medium-pressure introduction chambers 23 and 28, the low-pressure introduction chambers 24 and 30, and the high-pressure introduction chambers 25 and 29, in which the pressure is designed to be set by the pressure adjusting means, are provided. As such, even when the tar separation unit 2 and the tar combustion unit 3 are equipped with fluidizing injection nozzles 8 having a uniform channel cross-sectional area, a separation-side fluidization zone 18, a separation-side low injection zone 18a, a separation-side high injection zone 18b, a combustion-side fluidization zone 19, a combustion-side high injection zone 19a, and a combustion-side low injection zone 9b are formed similar to the example shown in FIGS. 2A and 2B. As a result, as shown in FIG. 2B by an arrow X, the circulating particles B circulate in the tar separation unit 2 and the tar combustion unit 3, and the tar in the gasification gas 9 can be continuously, effectively removed.

Figure 6:
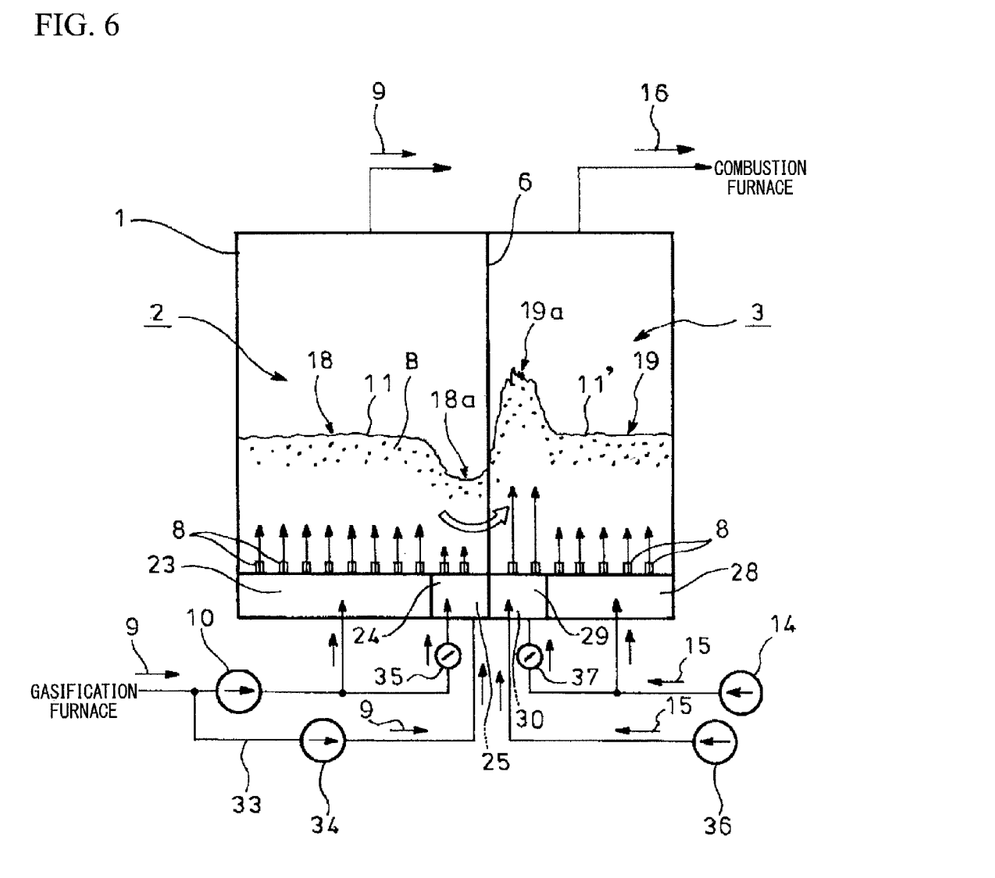
FIG. 6 is a front view showing an outline of a third embodiment of the tar removal device of the present invention which is similar to that of FIG. 5.

FIG. 6 is a front view showing an outline of a third embodiment of the tar removal device of the present invention which is similar to that of FIG. 5. In the embodiment of FIG. 6, a separate additional pressurization fan 34 is installed on a channel 33 branching off upstream from a pressurization fan 10. A gasification gas 9 of high pressure is directly guided from the additional pressurization fan 34 to a high-pressure introduction chamber 25, and a gasification gas 9 of medium pressure is directly guided from the pressurization fan 10 to a medium-pressure introduction chamber 23. Further, a gasification gas 9 of low pressure whose pressure is adjusted so as to be lower than that of the medium-pressure introduction chamber 23 by a second damper (pressure adjusting means) 35 is guided to a low-pressure introduction chamber 24.

Further, an additional air fan 36 is provided in addition to an air fan 14. Air 15 of high pressure is directly guided from the additional air fan 36 to a high-pressure introduction chamber 29, and air 15 of medium pressure is directly guided from the air fan 14 to a medium-pressure introduction chamber 28. Further, air 15 of low pressure whose pressure is adjusted so as to be lower than that of the medium-pressure introduction chamber 28 by a first damper (pressure adjusting means) 37 is guided to a low-pressure introduction chamber 30.

Further, in the present invention, with respect to the medium-, low-, and high-pressure introduction chambers 23, 24, and 25 of the tar separation unit 2 in the embodiment of FIG. 6, independent pressurization fans may be provided to set the pressure of the gasification gas 9, and the gasification gas 9 may be supplied. Further, with respect to the medium-, high- and low-pressure introduction chambers 28, 29, and 30 of the tar combustion unit 3, independent pressurization fans may be provided to set the pressure of the air 15, and the air 15 may be supplied.

Figure 7:
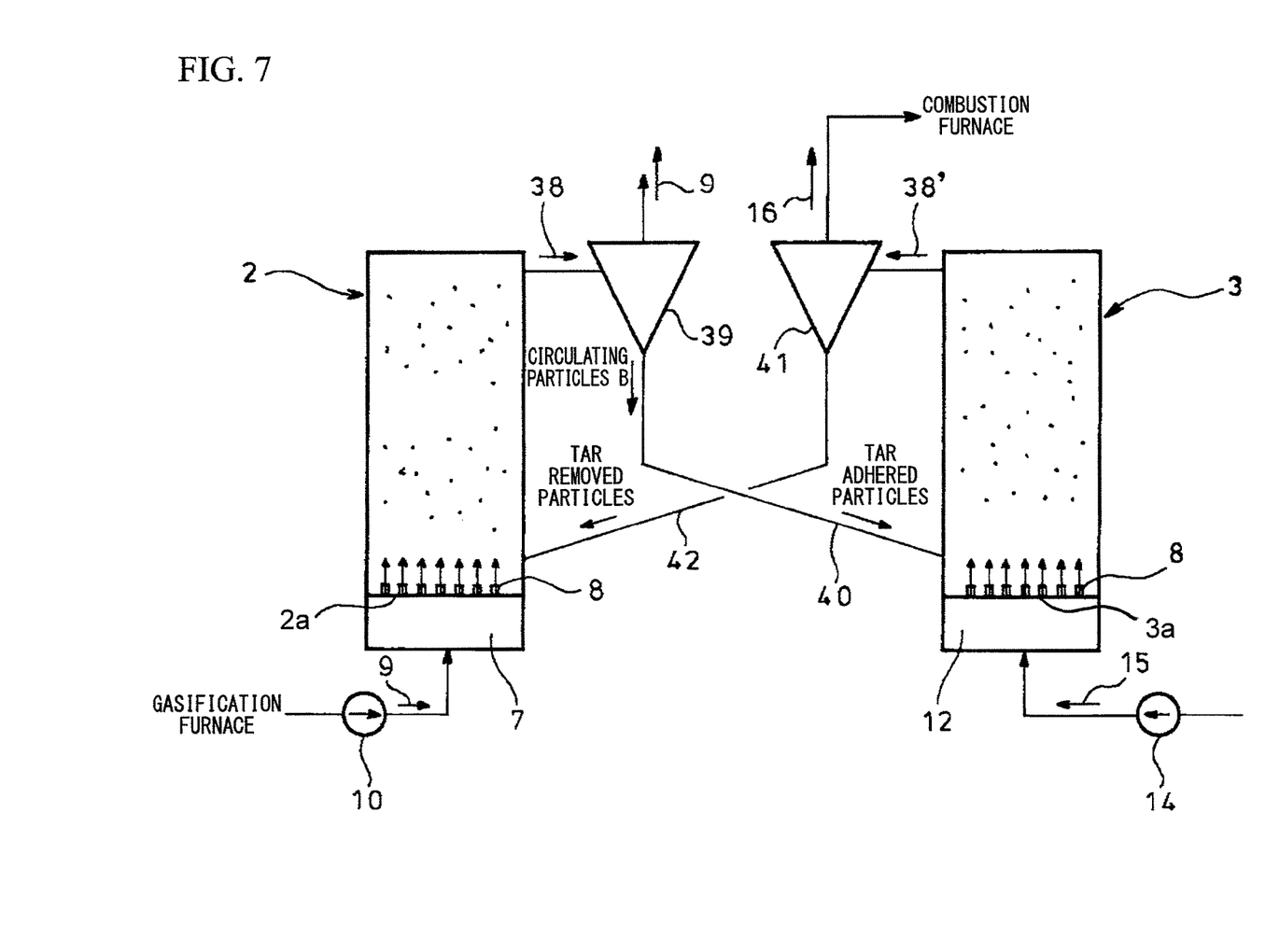
FIG. 7 is a front view showing an outline of a fourth embodiment of the tar removal device of the present invention.

FIG. 7 is a front view showing an outline of a third embodiment of the tar removal device of the present invention. In the embodiment of FIG. 7, the tar removal device is independently equipped with a tar separation unit 2 that ejects a gasification gas 9, which is supplied from a pressurization fan 10 to an introduction chamber 7, by fluidizing injection nozzles 8 provided at a bottom 2a of the tar separation unit 2, fluidizes circulating particles B, and adheres tar of the gasification gas 9 to the circulating particles B, and a tar combustion unit 3 that ejects air 15, which is supplied from an air fan 14 to an introduction chamber 12, by fluidizing injection nozzles 8 provided at a bottom 3a of the tar combustion unit 3, fluidizes circulating particles B, and burns tar of the circulating particles B. Here, the gasification gas 9 and the air 15 are ejected from the fluidizing injection nozzles 8 provided at the tar separation unit 2 and the fluidizing injection nozzles 8 provided at the tar combustion unit 3 with a greater ejection quantity than that ejected from the fluidizing injection nozzles 8 shown in FIGS. 2A to 6. The tar removal device is provided with a separation unit 39 that introduces a fluidized material 38 guided out of the tar separation unit 2 and separates the fluidized material 38 into the circulating particles B to which the tar is adhered and the gasification gas 9, a circulation path 40 that supplies the circulating particles B, to which the tar is adhered and which are separated by the separation unit 39, to the tar combustion unit 3, a separation unit 41 that introduces a fluidized material 38' guided out of the tar combustion unit 3 and separates the fluidized material 38' into the circulating particles B from which the tar is burnt and removed and the combustion gas 16, and a circulation path 42 that supplies the circulating particles B, from which the tar is removed and which are separated by the separation unit 41, to the tar separation unit 2.

Even in the tar removal device of FIG. 7, the circulating medium to which the tar is adhered at the tar separation unit 2 is cyclically supplied to the tar combustion unit 3, and the combustion of the tar is performed. The circulating medium in which the tar is burnt by the tar combustion unit 3 is cyclically supplied to the tar separation unit 2, and the adherence separation of the tar is performed again. As such, the tar of the gasification gas 9 can be continuously, effectively removed.

It is apparent that the tar removal device of the present invention is not limited only to the aforementioned embodiments, but can be modified and obtained in various ways without departing from the gist of the present invention. That is, all the shapes and combinations of the constituent members shown in the aforementioned embodiments are examples, and addition, omission, substitution, and other modification of the constitution are possible without departing from the spirit of the present invention. The present invention is not limited by the above description, but is only limited by the appended claims.

INDUSTRIAL APPLICABILITY

According to the tar removal device of the present invention, the tar fraction contained in the gasification gas generated in the gasification furnace can be effectively removed by the simple device constitution. Further, thermal efficiency of the device is increased, and a gasification rate is improved.

EXPLANATION OF REFERENCE 1 container main body, 2 tar separation unit, 2a bottom, 3 tar combustion unit, 3a bottom, 4, 5 passage, 6 vertical partition wall, 8 fluidizing injection nozzle, 9 gasification gas, 11, 11' fluidized bed, 15 air, 18 separation-side fluidization zone, 18a separation-side low injection zone, 18b separation-side high injection zone, 19 combustion-side fluidization zone, 19a combustion-side high injection zone, 19b combustion-side low injection zone, 20 horizontal partition wall, 21 low injection nozzle, 22 high injection nozzle, 23, 28 medium-pressure introduction chamber, 24, 30 low-pressure introduction chamber, 25, 29 high-pressure introduction chamber, 26, 31, 35, 37 first damper (pressure adjusting means), 27, 32 second damper (pressure adjusting means), 38, 38' fluidized material 39, 41 separation unit, 40, 42 circulation path, A heating medium, B circulating particle

The invention claimed is:

1. A tar removal device that removes tar contained in a gasification gas generated in a gasification furnace of a two-towered gasifier having a combustion furnace heating a heating medium and the gasification furnace introducing the heating medium heated in the combustion furnace to perform gasification of a starting material, the tar removal device comprising:

a tar separation unit that introduces the gasification gas from the gasification furnace to fluidize circulating particles so as to adhere the tar in the gasification gas to the circulating particles; and a tar combustion unit that introduces the circulating particles to which the tar is adhered at the tar separation unit, fluidizes the circulating particles using air so as to burn the tar adhered to the circulating particles, supplies the combustion gas in which the tar is burnt to the combustion furnace as a gas for combustion, and returns the circulating particles from which the tar is burnt and removed to the tar separation unit, wherein:

the tar separation unit and the tar combustion unit include fluidizing injection nozzles at bottoms thereof and are provided on left and right sides in a container main body; the tar separation unit and the tar combustion unit are partitioned by a vertical partition wall that extends forward and backward in the center of a facing position thereof and defines front and rear passages between the container main body and the vertical partition wall; a separation-side low injection zone is formed at a side of the tar separation unit of one of the front and rear passages, the gasification gas being injected in the separation-side low injection zone at a smaller injection quantity than a set injection quantity of a separation-side fluidization zone formed by uniform injection of the gasification gas performed by the fluidizing injection nozzles; a separation-side high injection zone is formed at a side of the tar separation unit of the other of the front and rear passages, the gasification gas being injected in the separation-side high injection zone at a greater injection quantity than the set injection quantity of the separation-side fluidization zone; a combustion-side high injection zone is formed at a side of the tar combustion unit of one of the front and rear passages, the air being injected in the combustion-side high injection zone at a greater injection quantity than a set injection quantity of a combustion-side fluidization zone formed by uniform injection of the air performed by the fluidizing injection nozzles, and a combustion-side low injection zone is formed at a side of the tar combustion unit of the other of the front and rear passages, the air being injected in the combustion-side low injection zone at a smaller injection quantity than the set injection quantity of the combustion-side fluidization zone; and the injection nozzles of the separation-side low injection zone have a channel cross-sectional area set to be smaller than the fluidizing injection nozzles provided at the separation-side fluidization zone; the injection nozzles provided at the separation-side high injection zone have a channel cross-sectional area set to be larger than the fluidizing injection nozzles provided at the separation-side fluidization zone; the injection nozzles of the combustion-side high injection zone have a channel cross-sectional area set to be larger than the fluidizing injection nozzles provided at the combustion-side fluidization zone; and the injection nozzles of the combustion-side low injection zone have a channel cross-sectional area set to be smaller than the fluidizing injection nozzles provided at the combustion-side fluidization zone.

2. The tar removal device according to claim 1, wherein: the bottom of the tar separation unit includes the fluidizing injection nozzles having a uniform channel cross-sectional area; the bottom of the tar combustion unit includes the fluidizing injection nozzles having a uniform channel cross-sectional area; the tar separation unit includes a medium-pressure introduction chamber guiding the gasification gas to the separation-side fluidization zone, a low-pressure introduction chamber guiding the gasification gas to the separation-side low injection zone, a high-pressure introduction chamber guiding the gasification gas to the separation-side high injection zone, and a pressure adjusting means adjusting a pressure of the gasification gas supplied to each of the medium-pressure introduction chamber, the low-pressure introduction chamber, and the high-pressure introduction chamber; and the tar combustion unit includes a medium-pressure introduction chamber guiding the air to the combustion-side fluidization zone, a high-pressure introduction chamber guiding the air to the combustion-side high injection zone, a low-pressure introduction chamber guiding the air to the combustion-side low injection zone, and a pressure adjusting means adjusting a pressure of the air supplied to each of the medium-pressure introduction chamber, the high-pressure introduction chamber, and the low-pressure introduction chamber.

3. A tar removal device that removes tar contained in a gasification gas generated in a gasification furnace of a two-towered gasifier having a combustion furnace heating a heating medium and the gasification furnace introducing the heating medium heated in the combustion furnace to perform gasification of a starting material, the tar removal device comprising:

a tar separation unit that introduces the gasification gas from the gasification furnace to fluidize circulating particles so as to adhere the tar in the gasification gas to the circulating particles; and a tar combustion unit that introduces the circulating particles to which the tar is adhered at the tar separation unit, fluidizes the circulating particles using air so as to burn the tar adhered to the circulating particles, supplies the combustion gas in which the tar is burnt to the combustion furnace as a gas for combustion, and returns the circulating particles from which the tar is burnt and removed to the tar separation unit, wherein:

the tar separation unit and the tar combustion unit include fluidizing injection nozzles at bottoms thereof and are provided on left and right sides in a container main body; the tar separation unit and the tar combustion unit are partitioned by a horizontal partition wall that extends leftward and rightward at a facing position between the tar separation unit and the tar combustion unit and defines front and rear passages between the container main body and the horizontal partition wall; a separation-side low injection zone is formed at a side of the tar separation unit of one of the front and rear passages, the gasification gas being injected in the separation-side low injection zone at a smaller injection quantity than a set injection quantity of a separation-side fluidization zone formed by uniform injection of the gasification gas performed by the fluidizing injection nozzles; a separation-side high injection zone is formed at a side of the tar separation unit of the other of the front and rear passages, the gasification gas being injected in the separation-side high injection zone at a greater injection quantity than the set injection quantity of the separation-side fluidization zone; a combustion-side high injection zone is formed at a side of the tar combustion unit of one of the front and rear passages, the air being injected in the combustion-side high injection zone at a greater injection quantity than a set injection quantity of a combustion-side fluidization zone formed by uniform injection of the air performed by the fluidizing injection nozzles, and a combustion-side low injection zone is formed at a side of the tar combustion unit of the other of the front and rear passages, the air being injected in the combustion-side low injection zone at a smaller injection quantity than the set injection quantity of the combustion-side fluidization zone; and the injection nozzles of the separation-side low injection zone have a channel cross-sectional area set to be smaller than the fluidizing injection nozzles provided at the separation-side fluidization zone; the injection nozzles provided at the separation-side high injection zone have a channel cross-sectional area set to be larger than the fluidizing injection nozzles provided at the separation-side fluidization zone; the injection nozzles of the combustion-side high injection zone have a channel cross-sectional area set to be larger than the fluidizing injection nozzles provided at the combustion-side fluidization zone; and the injection nozzles of the combustion-side low injection zone have a channel cross-sectional area set to be smaller than the fluidizing injection nozzles provided at the combustion-side fluidization zone.

4. The tar removal device according to claim 3, wherein: the bottom of the tar separation unit includes the fluidizing injection nozzles having a uniform channel cross-sectional area; the bottom of the tar combustion unit includes the fluidizing injection nozzles having a uniform channel cross-sectional area; the tar separation unit includes a medium-pressure introduction chamber guiding the gasification gas to the separation-side fluidization zone, a low-pressure introduction chamber guiding the gasification gas to the separation-side low injection zone, a high-pressure introduction chamber guiding the gasification gas to the separation-side high injection zone, and a pressure adjusting means adjusting a pressure of the gasification gas supplied to each of the medium-pressure introduction chamber, the low-pressure introduction chamber, and the high-pressure introduction chamber; and the tar combustion unit includes a medium-pressure introduction chamber guiding the air to the combustion-side fluidization zone, a high-pressure introduction chamber guiding the air to the combustion-side high injection zone, a low-pressure introduction chamber guiding the air to the combustion-side low injection zone, and a pressure adjusting means adjusting a pressure of the air supplied to each of the medium-pressure introduction chamber, the high-pressure introduction chamber, and the low-pressure introduction chamber.

5. A tar removal device that removes tar contained in a gasification gas generated in a gasification furnace of a two-towered gasifier having a combustion furnace heating a heating medium and the gasification furnace introducing the heating medium heated in the combustion furnace to perform gasification of a starting material, the tar removal device comprising:

a tar separation unit that introduces the gasification gas from the gasification furnace to fluidize circulating particles so as to adhere the tar in the gasification gas to the circulating particles; and a tar combustion unit that introduces the circulating particles to which the tar is adhered at the tar separation unit, fluidizes the circulating particles using air so as to burn the tar adhered to the circulating particles, supplies the combustion gas in which the tar is burnt to the combustion furnace as a gas for combustion, and returns the circulating particles from which the tar is burnt and removed to the tar separation unit, wherein: the tar separation unit that ejects the gasification gas to fluidize the circulating particles using the fluidizing injection nozzles provided at the bottom thereof and adheres the tar of the gasification gas to the circulating particles and the tar combustion unit that ejects the air to fluidize the circulating particles using the fluidizing injection nozzles provided at the bottom thereof and burns the tar of the circulating particles are independently provided, and the tar removal device further comprises a first separation unit that introduces a fluidized material guided out of the tar separation unit and separates the fluidized material into the circulating particles to which the tar is adhered and the gasification gas, a first circulation path that supplies the circulating particles, to which the tar is adhered and which is separated by the first separation unit, to the tar combustion unit, a second separation unit that introduces a fluidized material guided out of the tar combustion unit and separates the fluidized material into the circulating particles from which the tar is burnt and a combustion exhaust gas, and a second circulation path that supplies the circulating particles, from which the tar is burnt and which are separated by the second separation unit, to the tar separation unit.

* * * * *